US00RE40354E

(19) United States
(12) Reissued Patent
Cornell et al.

(10) Patent Number: US RE40,354 E
(45) Date of Reissued Patent: Jun. 3, 2008

(54) ELECTRICAL HOUSING WITH NON-INTEGRAL CABLE OUTLET PORT MEMBER

(75) Inventors: Jeffrey L. Cornell, Coldwater, MI (US); Thomas H. Phlipot, Quincy, MI (US)

(73) Assignee: Progressive Dynamics, Inc., Marshall, MI (US)

(21) Appl. No.: 11/101,367

(22) Filed: Apr. 6, 2005

Related U.S. Patent Documents

Reissue of:
(64) Patent No.: 6,430,036
Issued: Aug. 6, 2002
Appl. No.: 09/752,191
Filed: Dec. 29, 2000

(51) Int. Cl.
*H02B 01/20* (2006.01)
*H02B 01/30* (2006.01)
*H02G 13/00* (2006.01)

(52) U.S. Cl. ..... 361/648; 174/64
(58) Field of Classification Search ..... 361/601, 361/611, 622, 624, 641, 648, 826, 827; 174/68.2, 174/70 R, 71 B, 88 B, 99 B, 64; 439/212, 439/76.2
See application file for complete search history.

(56) References Cited

U.S. PATENT DOCUMENTS

| | | | | |
|---|---|---|---|---|
| 4,236,778 | A | 12/1980 | Hughes et al. | 339/97 P |
| 4,304,957 | A | 12/1981 | Slater et al. | 174/65 R |
| 4,414,427 | A | 11/1983 | Slater et al. | 174/65 R |
| 5,207,591 | A | 5/1993 | Ozaki et al. | 439/212 |
| 5,241,136 | A | 8/1993 | Michaelis et al. | 174/151 |
| 5,474,475 | A | 12/1995 | Yamaguchi | 439/621 |
| 5,479,505 | A | 12/1995 | Butler et al. | 379/412 |
| 5,645,443 | A | 7/1997 | Schaller | 439/212 |
| 5,726,392 | A | 3/1998 | Farr et al. | 174/65 G |
| 5,759,053 | A | 6/1998 | Sugiyama | 439/212 |
| 5,764,487 | A | 6/1998 | Natsume | 361/775 |
| 5,928,004 | A | 7/1999 | Sumida et al. | 439/76.2 |
| 6,007,351 | A | 12/1999 | Gabrisko, Jr. et al. | 439/76.2 |
| 6,194,659 | B1 | 2/2001 | Cornu | 174/65 |

*Primary Examiner*—Chandrika Prasad
(74) *Attorney, Agent, or Firm*—Young Basile

(57) ABSTRACT

A housing for electrical devices such as connectors, circuit breakers, and fuse panels. A cable outlet port member is separate from the housing to provide unidirectional resistance to movement of a cable relative to the housing. The non-integral relationship permits the members to be replaced in the event of damage. A busbar formed by a stamping and bending operation is also disclosed for use in combination with conventional circuit breakers.

10 Claims, 5 Drawing Sheets

ELECTRICAL HOUSING WITH NON-INTEGRAL CABLE OUTLET PORT MEMBER

Matter enclosed in heavy brackets [ ] appears in the original patent but forms no part of this reissue specification; matter printed in italics indicates the additions made by reissue.

FIELD OF THE INVENTION

This invention relates to housings for electrical devices such as connectors, fuses, and circuit breakers and, more particularly, to an improved housing having a non-integral cable de-tensioning member which is removably attached to the housing for simple economical replacement in the event of breakage. This invention also relates to an improved busbar for attachment to circuit breakers and to a method of making such a busbar.

BACKGROUND OF THE INVENTION

Housings for electrical devices, such as connectors, circuit breakers, and fuse panels, are used in many applications, including recreational vehicles such as motor homes and boats. In a typical application, the housing receives multiple cables for connection to devices within the housing and to carry electrical power to a number of devices outside of the housing. It is good practice to use de-tensioning devices within the housing to insure that electrical connections between the cables and the devices within the housing are not strained or stressed if tension is applied to the cable at some point outside the housing, an event which commonly occurs during installation and/or service.

One way to provide a de-tensioning structure is to mold a port into a panel of the housing having opposing resilient fingers defining a narrow slit-like aperture which unidirectionally resists passage of an electrical cable through the aperture. In short, the fingers permit the insertion of the cable into the housing but resist any movement in the opposite direction such as may occur if the cable were tugged or pulled at some point outside of the housing.

The problem with this approach is that the opposed fingers which make up the anti-tensioning device are frequently broken off during installation. Under these circumstances, good practice requires discarding and replacing the entire housing. Where the housing is complex, such a practice is costly and time consuming.

SUMMARY OF THE INVENTION

A first aspect of this invention is the creation and provision of an improved housing for electrical devices having a non-integral; i.e., separately formed electrical cable outlet port member which provides the desired de-tensioning characteristic but which, because it is formed separately from the housing, can be economically and quickly replaced if broken during the installation or servicing procedures.

The non-integral outlet port member and its association with the housing can take any of several shapes and configurations, two of which are disclosed in detail in this document. In one form, an essentially rectangular member is screwed or snapped to a rear panel of the housing. In another form, the member is configured so as to slide into an opening in a side panel of the housing and be retained by a separate cover.

Another aspect of the invention is the provision of an inexpensive, easily formed busbar for mounting within an electrical device housing to receive a plurality of conventional circuit breakers and make electrical connections therewith. The improved busbar can be manufactured by creating an inexpensive stamping and thereafter bending portions of the stamping to produce the plurality of spaced, parallel stabs. In the configuration disclosed herein, the spacing between the stabs is independent of the height of the stabs.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENTS OF THE INVENTIONS

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

Figure 1:
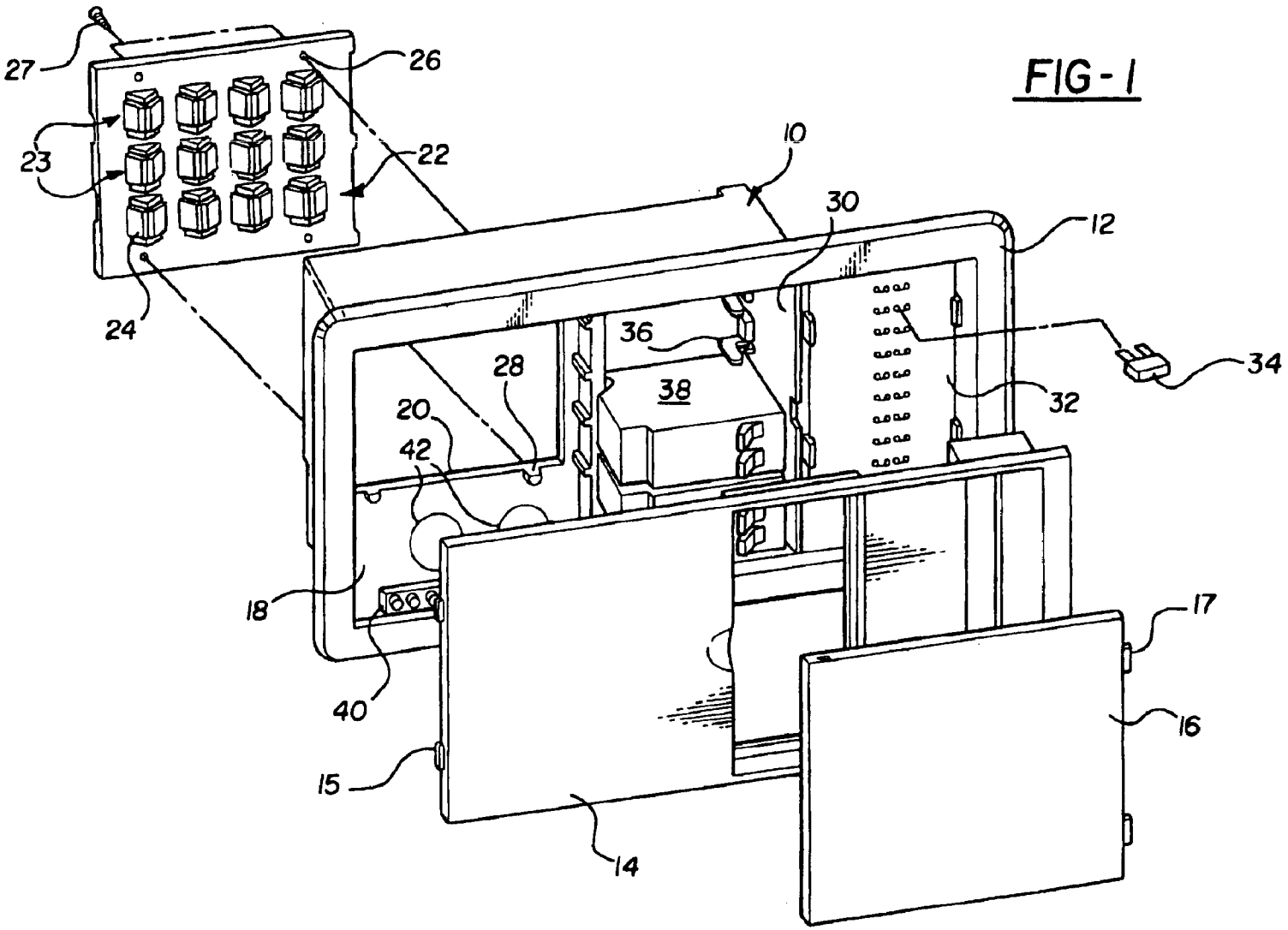
FIG. 1 is an exploded perspective view of an electrical distribution housing embodying one form of the inventive; cable outlet port member and the inventive busbar.
Figure 2:
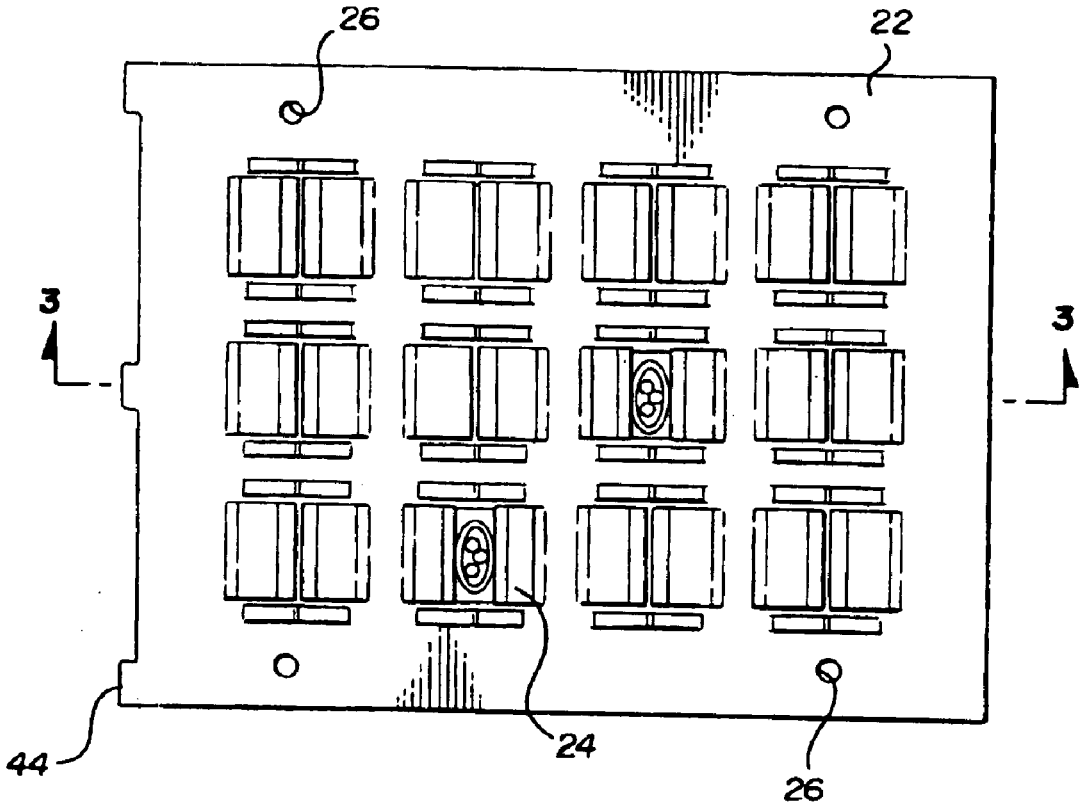
FIG. 2 is a plan view of the outlet port member in the combination of FIG. 1.
Figure 3:
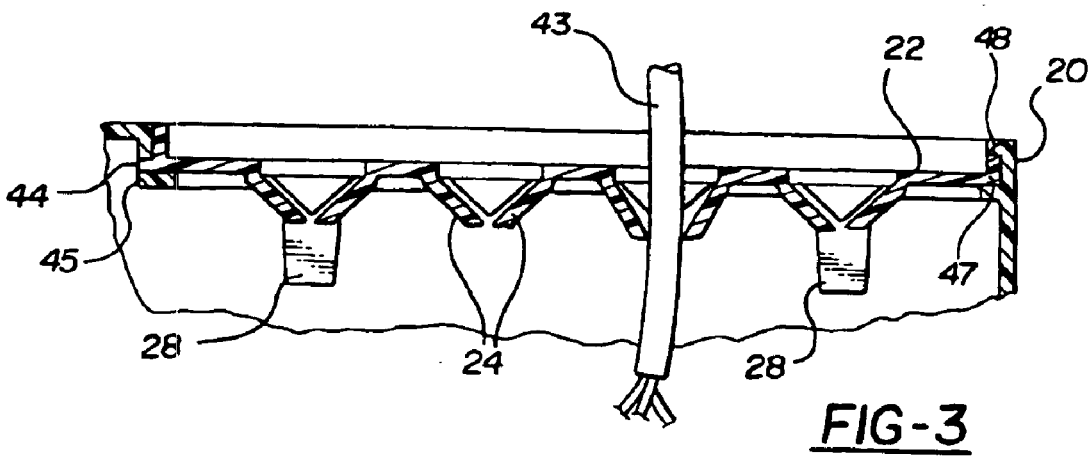
FIG. 3 is a sectional view along section line 3—3 of the device of FIG. 2.

Referring now to FIGS. 1 through 3, a molded plastic housing 10 of the size, weight, and configuration suitable for use as an electrical distribution center in recreational vehicles is shown. The housing 10 is injection molded from a suitable phenolic resin to exhibit a decorative and functional front peripheral flange 12, a separate snap-in cover 14 having edge tabs 13 and an access patch 16 having edge tabs 17 which cooperates with the removable cover 14.

The housing is further provided with an integral, rigid, rear panel 18 having formed therein an essentially rectangular opening having a peripheral edge 20 adapted to removably receive, a molded plastic outlet port member 22 having electrical cable ports 23 defined by opposed resilient plastic fingers 24 which are designed to unidirectionally resist passage of an electrical cable 43 there through and to

[omit] *permit* passage of the cable in the opposite direction. Holes 26 are provided in the member 22 to receive screws 27 which enter into bosses 28 formed in the panel 18 so that the port member 22 may be removably attached to the housing 10. As shown in FIGS. 2 and 3 device may also be removably connected to peripheral edge 20 by edge tabs 44 which snap into corresponding slots 45 together with lip 47 being received into recess 48. However, the non-integral relationship also permits the member 22 to be removed from the housing 10 and replaced if one or more of the fingers 24 is broken during installation and/or servicing. It is understood that a wide variety of attachments mechanisms are available to removably attach member 22 to housing 10.

Housing 10 further comprises an interior panel 30 which essentially divides the interior of the housing into AC and DC sections, the AC section being the larger section on the left, as shown in FIG. 1. On the DC side, a fuse panel 32, receiving a plurality of standard automotive-type fuses 34, is provided. On the AC side, the panel 30 is configured to receive an aluminum busbar 36 hereinafter described in detail. Conventional circuit breakers 38 are mounted on the stabs of the busbar 36 in a spaced, parallel stack as shown in FIG. 1. Obviously, other configurations and/or interior arrangements may be provided.

Additional electrical connective devices such as the junction block shown at 40 may be provided on the interior of the housing 10. In addition, the rear panel 18 is provided with knockouts 42 for cable routing purposes.

Because of the non-integral nature of the member 22 with the housing 10, a number of members 22 may be taken to the job site and readily substituted into the place of the original member should one or more of the fingers 24 be broken off during the installation or servicing procedure. When this occurs during servicing, the non-integral nature of the member 22 allows it to be removed and replaced without loss of the de-tensioning feature which good electrical service and installation practice requires.

Figure 4:
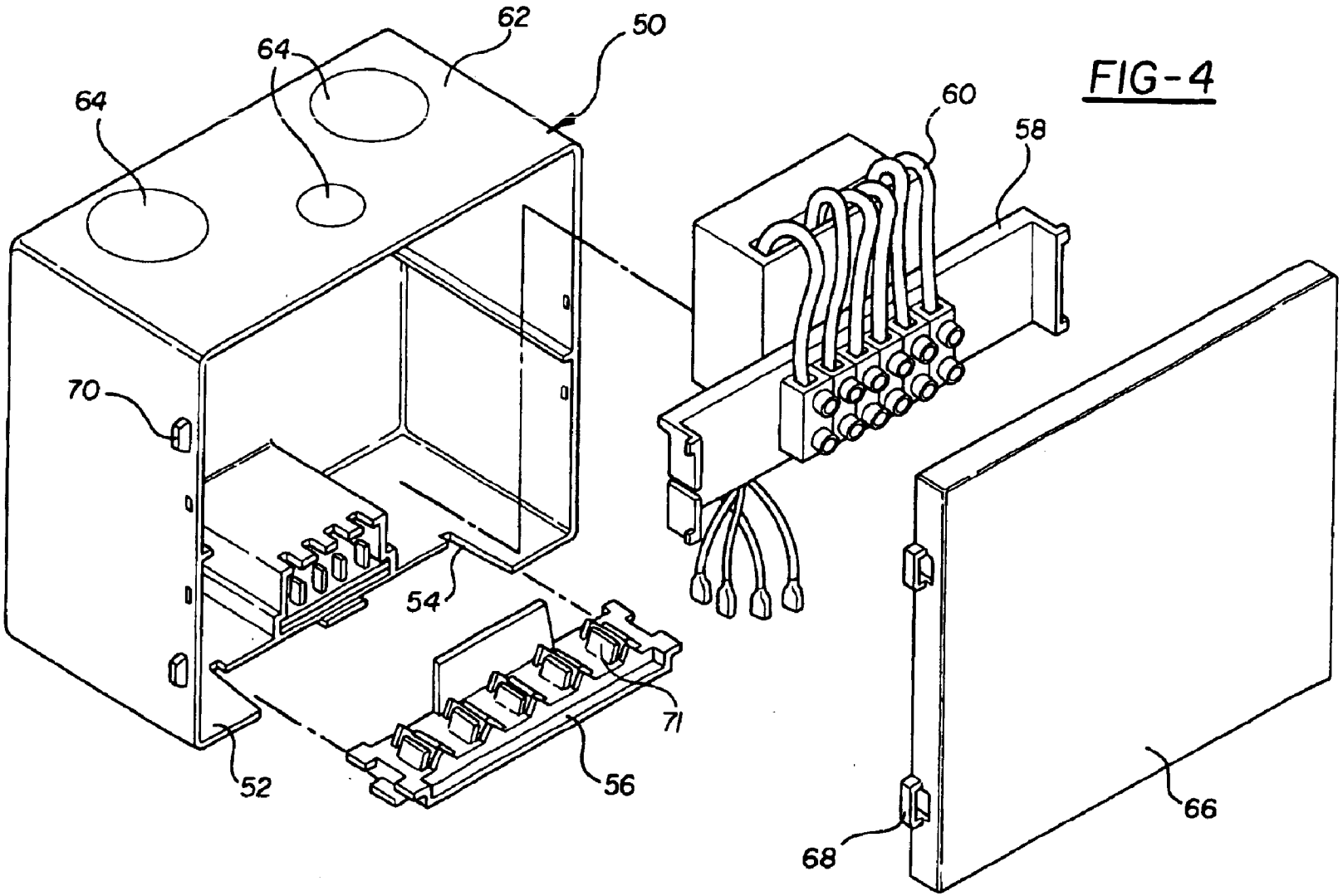
FIG. 4 is an exploded perspective view of the second embodiment of the cable outlet port invention.
Figure 5:
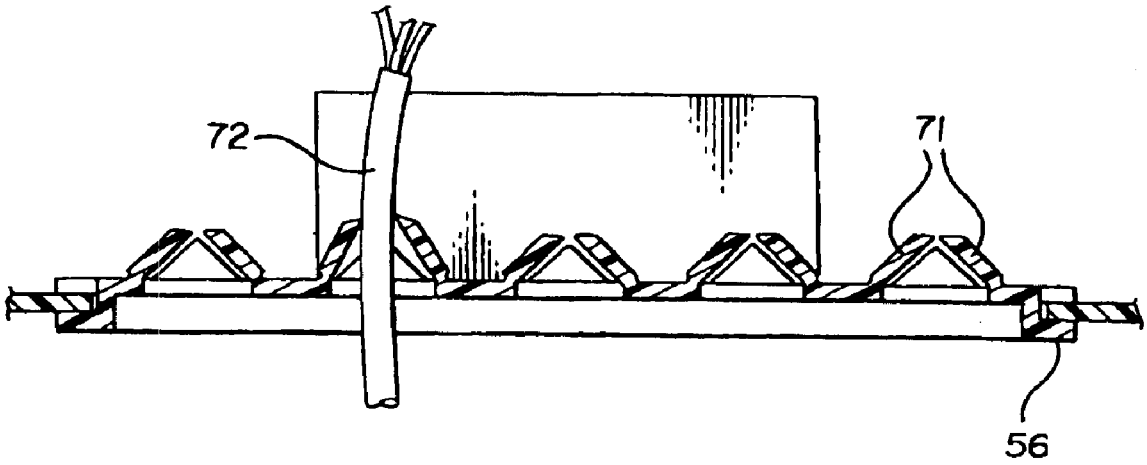
FIG. 5 is a sectional view of the device of FIG. 4.
Figure 6:
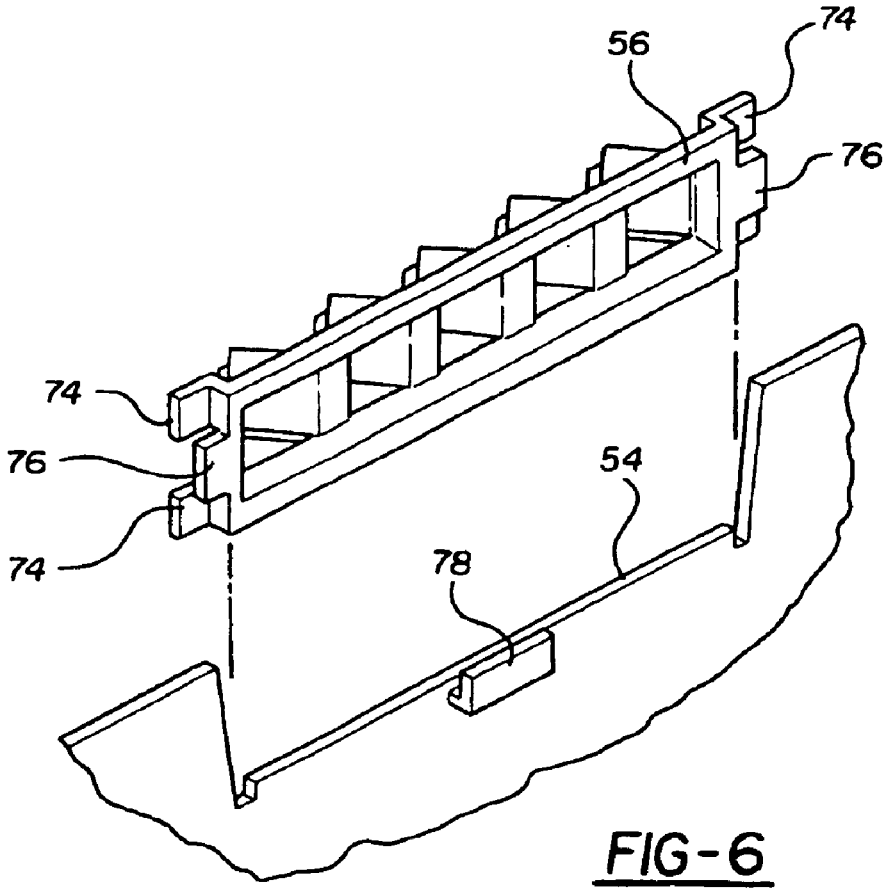
FIG. 6 is an exploded, detailed view of the device of FIG. 5 showing the manner in which it is removably attached to the housing.

Referring now to FIGS. 4–6, a second embodiment of the invention as it pertains to the non-integral outlet port member and its configuration will be described. In these figures, a molded plastic housing 30 is provided with such size and configuration as to be suitable for use as a transfer box in recreational vehicles and other applications. The housing 50 comprises a number of panels forming a box-like structure; one of these panels is a side panel 52 having a rectangular opening formed therein. The opening 54 receives a cable outlet port member 56 having a rectangular strip-like configuration and fingers 74 and 76 which permit the member to slide into and out of the opening 54 as shown in more detail in FIG. 6.

The housing 50 receives any of a number of different types of electrical devices, in this case, a snap-in bracket 58 carrying connectors 60. A top panel 62 of the housing 50 is provided with knock-outs 64 for cable routing purposes. A cover 66 of injection molded plastic construction is provided with edge loops 68 operating with tabs 70 on the housing 50 to provide a snap-on relationship.

As shown in FIG. 5, the member 56 is provided with opposed resilient plastic fingers 71 which define a plurality of spaced parallel ports to unidirectionally permit passage of cables 72 but to resist withdrawal of the cables from the housing. As described above, fingers 74 and 76 are formed on the opposite edges of the member 56 to straddle the peripheral edge 34 of the opening in the housing 50 so that the member 56 can be easily positioned in or removed by a simple sliding action which eliminates the necessity of screws or other separate fasteners. A detail 78 is molded integrally with the housing panel to stabilize the center of the member 56 in the installed condition.

Figure 7:
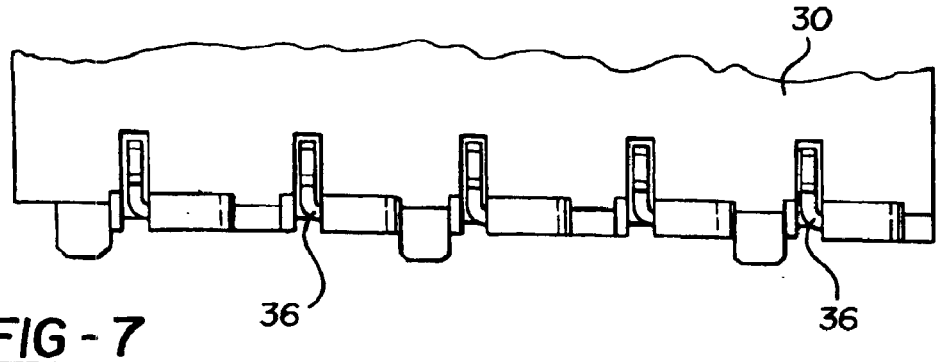
FIG. 7 is a detail of the busbar in the device of FIG. 1.
Figure 8:
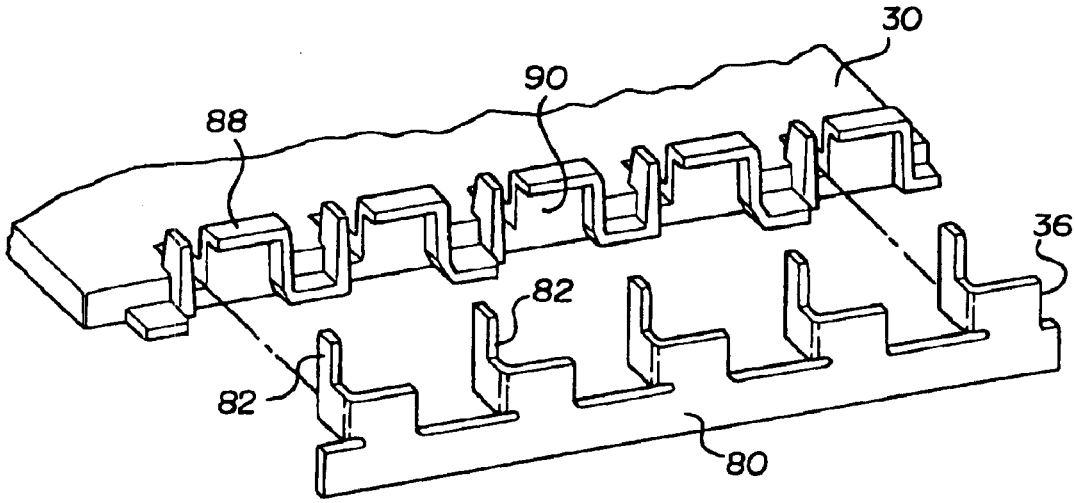
FIG. 8 is an exploded perspective detail of the busbar from the device of FIG. 1.
Figure 9:
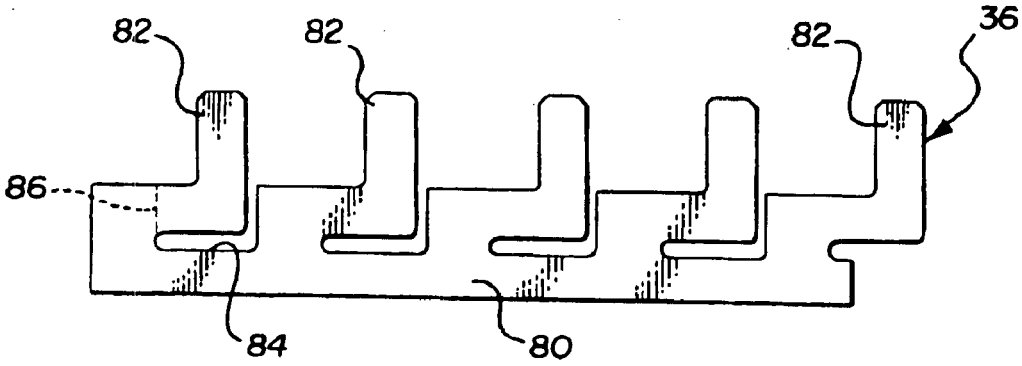
FIG. 9 is a plan view of the busbar of FIGS. 7 and 8 at an intermediate stage in the manufacturing process.

Referring now to FIGS. 7, 8, and 9, an improved busbar 36 suitable for use in the device of FIG. 1 is shown. The busbar comprises the stamped, aluminum plate 80 having a plurality of regularly spaced parallel stabs 82 projecting from one lateral edge thereof and defined in part by L-shaped slots for apertures 84 in the plate 80. The apertures 84 open to the edge of the plate from which the stabs 82 project.

The configuration of the busbar 36; i.e., flat and planar, is shown in FIG. 9 as formed by a simple stamping operation. Thereafter, the stabs 82 are bent or folded out of the plane of the plate 80 along fold lines 86 to provide the configuration shown in FIG. 8. It will be noted that in this configuration the height of the stabs 82 is independent of the lateral spacing between them. Therefore, tall stabs 82 suitable for use with conventional and contemporary circuit breakers may be provided without requiring additional space in between the stabs which increase spacing would, in turn, increase the overall size of the housing 10. As shown in FIG. 8, the busbar 36 fits onto and into the panel 30 by means of a number of strategically shaped flanges 88 forming spaced pockets 90. The busbar 36 may be used in any application where a plurality of circuit breakers are disclosed in stacked; i.e., spaced parallel relationship within a housing.

What is claimed is:

1. For use in combination with an electrical system housing [of the type] having one or more rigid panels and an opening defined by at least one of said panels comprising:

an electrical cable outlet port member having a first end and a second end, said member being separate from but removably attachable to said housing in substantial registry with said opening;

said member comprising a plurality of cable outlet ports, each defined by integrally molded opposed plastic fingers for unidirectionally resisting passage of an electrical cable there through, said member includes at least one tab on said first end for engaging at least one mating slot in said housing and said [member] *housing* having at least one notch for providing a snap fit connection between said housing and said second end of said member.

2. The apparatus as defined in claim 1 wherein said panel defines a flange and a seat surrounding said opening, said member in the installed position resting on said seat within said flange.

3. The apparatus as defined in claim 1 further comprising screws for removably attaching the outlet port member to the housing.

[4. The apparatus as defined in claim 1 wherein said member comprises fingers to receive and straddle the peripheral edges of said opening so that the member may slide into and out of said opening.]

[5. The apparatus as defined in claim 4 further comprising a cover attachable to said housing for retaining said member within said opening.]

6. In combination comprising:

a housing for electrical devices including at least one panel having an opening formed therein; and an electrical cable output port member having a first end and a second end adapted to be removably secured to said panel in substantial registry with said opening;

said outlet port member comprising [the] *a* plurality of cable outlet ports each defined by integrally molded opposed plastic fingers for unidirectionally resisting passage of an electrical cable there through, said member includes at least one tab on said first end for engaging at least one mating slot in said housing and said [member] *housing* having at least one notch for providing a snap fit connection between said housing and said second end of said member.

7. The apparatus as defined in claim 6 wherein said panel further comprises a peripheral flange and a seat around said opening, said member in the installed position resting within said opening and on said seat, said combination further comprising means for securing said member within said opening.

8. The apparatus as defined in claim 7 wherein said means comprises screws.

[9. The apparatus as defined in claim 6 wherein said member is formed with peripheral fingers which straddle the peripheral edge of said opening in the installed position whereby said member may slide into and out of said opening.]

[10. The apparatus as defined in claim 9 further comprising a cover which is removably securable to said housing for retaining said member in the installed position.]

[11. The apparatus as defined in claim 10 wherein said cover is plastic.]

[12. The apparatus as defined in claim 11 wherein said housing has a peripheral mounting flange.]

13. The apparatus as defined in claim 6 further comprising a conductive metallic busbar mounted to said housing and having a plurality of regularly spaced, parallel stabs projecting into the carrier of said housing to receive circuit breakers in operable association therewith.

14. The apparatus as defined in claim 13 wherein said stabs are flat planar elements disclosed in parallel spaced relationship with one another and integral with a base plate.

*15. The apparatus as defined in claim 1 wherein said panel further comprises a peripheral flange and a seat around said opening, said member in the installed position resting within said opening and on said seat, said combination further comprising means for securing said member within said opening.*

*16. The apparatus as defined in claim 15 wherein said means comprises screws.*

* * * * *